(12) United States Patent
Nakamura (10) Patent No.: US 9,330,194 B2
(45) Date of Patent: May 3, 2016

(54) COMMUNICATION DEVICE, WEB SERVER APPARATUS AND COMMUNICATION SYSTEM

(75) Inventor: Ayano Nakamura, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 478 days.

(21) Appl. No.: 13/132,779

(22) PCT Filed: Dec. 25, 2009

(86) PCT No.: PCT/JP2009/071698
§ 371 (c)(1),
(2), (4) Date: Jun. 3, 2011

(87) PCT Pub. No.: WO2010/074274
PCT Pub. Date: Jul. 1, 2010

(65) Prior Publication Data
US 2011/0238745 A1 Sep. 29, 2011

(30) Foreign Application Priority Data
Dec. 25, 2008 (JP) ................................. 2008-331442

(51) Int. Cl.
*G06F 15/16* (2006.01)
*G06F 17/30* (2006.01)
*H04M 1/725* (2006.01)
*G06F 3/147* (2006.01)

(52) U.S. Cl.
CPC ..... *G06F 17/30899* (2013.01); *H04M 1/72561* (2013.01); *G06F 3/147* (2013.01); *G09G 2370/027* (2013.01); *G09G 2370/16* (2013.01)

(58) Field of Classification Search
CPC .................................................. G06F 17/30899
USPC .......................................................... 709/203
See application file for complete search history.

(56) References Cited

U.S. PATENT DOCUMENTS

| 6,253,204 | B1 * | 6/2001 | Glass ................ G06F 17/30887 |
| 6,665,838 | B1 * | 12/2003 | Brown et al. ................. 715/205 |
| 6,931,439 | B1 * | 8/2005 | Hanmann et al. ............. 709/219 |
| 7,155,489 | B1 * | 12/2006 | Heilbron ........... G06F 17/30905 707/999.003 |
| 7,467,349 | B1 * | 12/2008 | Bryar ................ G06F 17/30905 715/200 |

(Continued)

FOREIGN PATENT DOCUMENTS

| JP | 10-171705 A | 6/1998 |
| JP | 2001-236202 A | 8/2001 |
| JP | 2002-259441 A | 9/2002 |
| JP | 2003-018489 A | 1/2003 |
| JP | 2007-034652 A | 2/2007 |
| JP | 3949923 B2 | 7/2007 |

OTHER PUBLICATIONS

International Search Report for PCT/JP2009-071698 mailed Mar. 23, 2010.

*Primary Examiner* — Andrew Georgandellis
(74) *Attorney, Agent, or Firm* — Hauptman Ham, LLP (57) ABSTRACT

According to one embodiment, a communication device includes a reception unit, a display unit, and a control unit. The reception unit receives, based on a connection request for a first web page, information of the first web page that includes specific information for instructing a connection to a second web page and information representing a communication status of the second web page. The control unit controls a display form of the specific information based on the information representing the communication status of the second web page when displaying the first web page on the display unit.

6 Claims, 7 Drawing Sheets

(56) References Cited

U.S. PATENT DOCUMENTS

| | | |
|---|---|---|
| 2002/0075302 A1 | 6/2002 | Simchik |
| 2004/0088373 A1* | 5/2004 | Karukka ........... G06F 17/30873 709/217 |
| 2006/0069617 A1* | 3/2006 | Milener ............ G06F 17/30902 705/14.69 |
| 2008/0177724 A1* | 7/2008 | Reponen ........... G06F 17/30867 |
| 2008/0235565 A1* | 9/2008 | Ackerman et al. ............. 715/205 |

* cited by examiner

| SPECIFIC INFORMATION | NUMBER OF BROWSING TIMES |
|---|---|
| LINK A | 10000 |
| LINK B | 4000 |
| LINK C | 6000 |
| LINK D | 4000 |
| LINK E | 25000 |
| LINK F | 200 |
| LINK G | 1000 |
| LINK H | 8000 |

FIG.6B

| SPECIFIC INFORMATION | NUMBER OF BROWSING TIMES |
|---|---|
| LINK E | 25000 |
| LINK A | 10000 |
| LINK H | 8000 |
| LINK C | 6000 |
| LINK B | 4000 |
| LINK D | 4000 |
| LINK G | 1000 |
| LINK F | 200 |

COMMUNICATION DEVICE, WEB SERVER APPARATUS AND COMMUNICATION SYSTEM

RELATED APPLICATIONS

The present application is a National Phase of, International Application Number PCT/JP2009/071698, filed Dec. 25, 2008, which claims priority of Japanese Patent Application No. 2008-331442, filed Dec. 25, 2008.

TECHNICAL FIELD

The present invention relates to a mobile terminal device having a communication function, a server that communicates with a mobile terminal device, and a communication system that includes a mobile terminal device and a server. More specifically, the present invention relates to a mobile terminal device that acquires information of a web page from a server through a communication function, a server that transmits information of a web page to a mobile terminal device, and a communication system in which information of a web page is transmitted and received between a mobile terminal and a server.

BACKGROUND ART

In recent years, there has been an in crease in mobile terminal devices such as a mobile telephone that have a function of communicating with a server through a communication link to acquire information of a web page on a network and displaying a web page on a screen based on the acquired information of the web page.

Further, there has been suggested a technique that changes a method of displaying a web page, according to a user, using information of a web page in order to more suitably browse the web page (for example, Patent Literatures 1 to 3).

CITATION LIST

Patent Literature

Patent Literature 1: Japanese Patent No. 3949923
Patent Literature 2: Japanese Patent Application Laid-Open No. 2003-18489
Patent Literature 3: Japanese Patent Application Laid-Open No. 2001-236202

DISCLOSURE OF INVENTION

Problems to be Solved by the Invention

Here, a web page displayed on a display unit sometimes includes specific information that specifies another web page. A user of a mobile terminal device can browse another web page by selecting the specific information specifying another web page included in the displayed web page, acquiring information of another web page, and displaying another web page.

However, a display form of the specific information specifying another web page has been uniform.

The present invention aims to provide a communication device, a web server apparatus, and a communication system which are capable of controlling the display form of the specific information specifying another web page included in the web page.

SUMMARY OF THE INVENTION

A communication device according to an aspect of the present invention includes: a reception unit that receives information of a predetermined web page based on a connection request for the predetermined web page; a display unit that displays the predetermined web page based on the information of the predetermined web page received by the reception unit; and a control unit that controls a display of the predetermined web page on the display unit. The predetermined web page includes specific information for instructing a connection to another web page. The reception unit receives the information of the predetermined web page and information representing a communication status of another web page. The control unit controls a display form of the specific information based on the information representing the communication status of another web page when displaying the predetermined web page on the display unit.

According to another aspect of the present invention includes, the reception unit may receive information related to a browsing situation of another web page as the information representing the communication status, and the control unit may control the display form of the specific information based on the browsing situation of another web page when displaying the predetermined web page on the display unit.

According to another aspect of the present invention includes, the reception unit may receive information related to an access situation to another web page as the information related to the browsing situation, and the control unit may control the display form of the specific information based on the access situation to another web page when displaying the predetermined web page on the display unit.

According to another aspect of the present invention includes, the access situation to another web page may be an access situation to another web page over a set time period.

According to another aspect of the present invention includes, the set time period may be a predetermined time period before a time point when the connection request for the predetermined web page has been performed.

According to another aspect of the present invention includes, the reception unit may receive information related to whether or not another web page is in a connectable situation as the information representing the communication status, and the control unit may control the display form of the specific information based on whether or not another web page is in a connectable situation when displaying the predetermined web page on the display unit.

According to another aspect of the present invention includes, the control unit may control at least one of a display size and a display color of the specific information as the display forms of the specific information.

A communication system according to another aspect of the present invention includes a communication device and a web server apparatus. The communication device includes a reception unit that receives information of a predetermined web page based on a connection request for the predetermined web page, a display unit that displays the predetermined web page based on the information of the predetermined web page received by the reception unit, and a control unit that controls a display of the predetermined web page on the display unit. The web server apparatus includes a storage unit that stores the information of the predetermined web page, and a transmission unit that is communicable with the communication device and transmits the information of the predetermined web page stored in the storage unit to the communication device based on the connection request for the predetermined web page from the communication device.

The predetermined web page includes specific information for instructing a connection to another web page, and the control unit displays the specific information in a display form based on a communication status of another web page when displaying the predetermined web page on the display unit.

According to another aspect of the present invention includes, the transmission unit may transmit the information of the predetermined web page and information representing the communication status of another web page based on the connection request for the predetermined web page from the communication device, and the control unit may control a display form of the specific information based on the information representing the communication status of another web page received by the reception unit when displaying the predetermined web page on the display unit.

According to another aspect of the present invention includes, the transmission unit may transmit information of the predetermined web page in which the display form of the specific information in the predetermined web page has been changed based on the communication status of another web page, and the control unit may display the predetermined web page on the display unit according to the information of the predetermined web page in which the display form of the specific information in the predetermined web page has been changed based on the communication status of another web page received by the reception unit.

A web server apparatus according to another aspect of the present invention includes: a storage unit that stores information of a predetermined web page; and a transmission unit that is communicable with the communication device and transmits information of the predetermined web page stored in the storage unit to the communication device based on a connection request for the predetermined web page from the communication device. The predetermined web page includes specific information for instructing a connection to another web page, and the transmission unit transmits the information of the predetermined web page and information representing the communication status of another web page to the communication device based on the connection request for the predetermined web page from the communication device.

According to another aspect of the present invention includes, the transmission unit may transmit the information of the predetermined web page in which a display form of the specific information in the predetermined web page has been changed based on the communication status of another web page.

EFFECT OF THE INVENTION

According to a communication device, a web server apparatus, and a communication system of the present invention, there is an effect capable of improving user convenience by controlling the display form of the specific information included in the web page based on information related to a browsing status of another web page.

DESCRIPTION OF EMBODIMENTS

Hereinafter, embodiments of a communication device, a web server apparatus, and a communication system according to the present invention will be described in detail with reference to the accompanying drawings. The present invention is not limited to the following embodiments. In embodiment described below, a mobile terminal device, more specifically, a so-called mobile telephone device will be described as a communication device, but the present invention is not limited thereto. The communication device of the present invention can be used for various mobile terminal devices, which have a function of transmitting/receiving data to/from a network or an external terminal, such as a personal digital assistant (PDA), a portable navigation device, a portable game machine, and a portable television.

Figure 1:
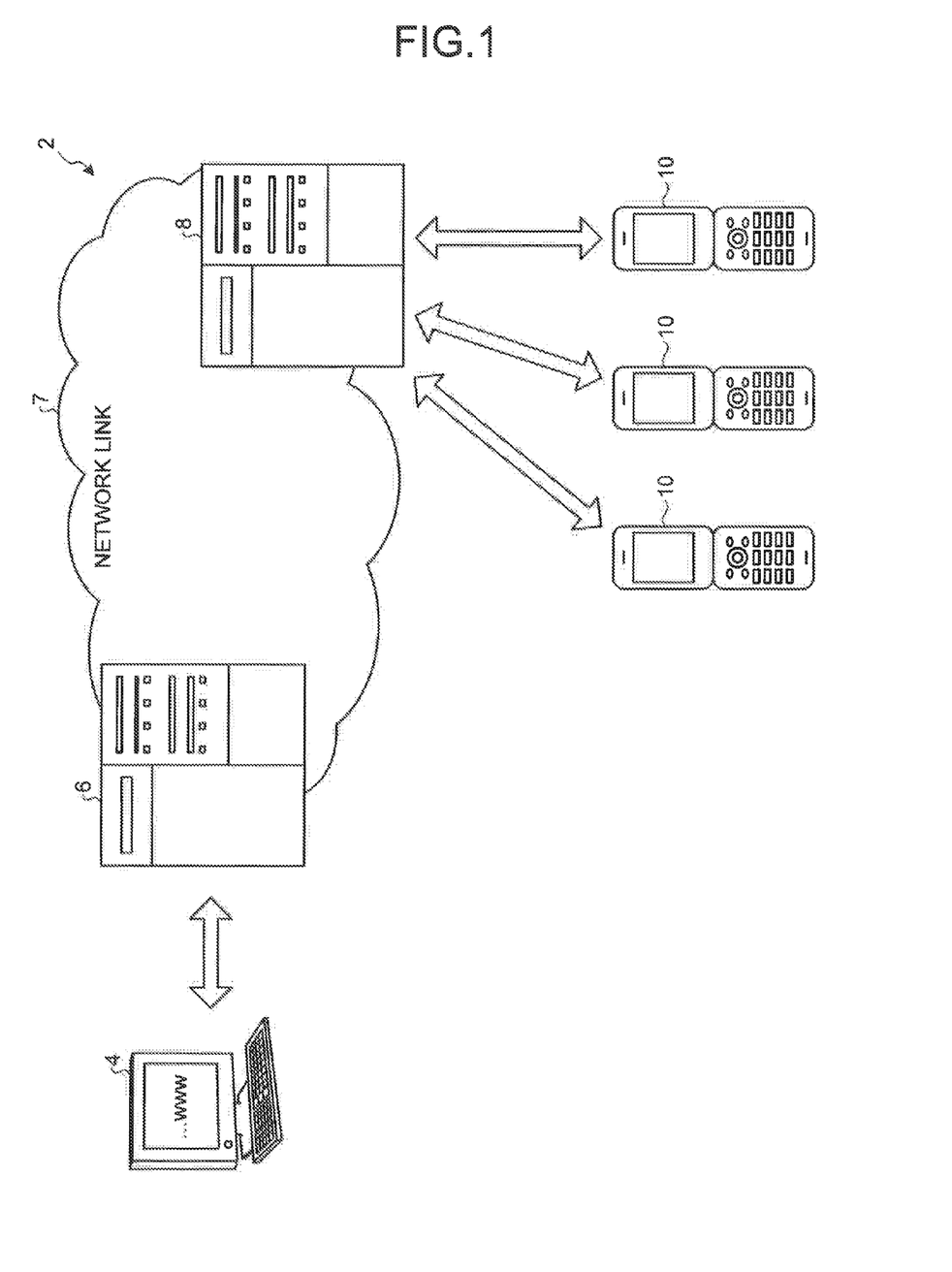
FIG. 1 is a schematic diagram illustrating a schematic configuration of an embodiment of a network system having a communication system according to the present invention.

FIG. 1 is a schematic diagram illustrating a schematic configuration of an embodiment of a network system having a communication system according to the present invention. A network system 2 includes a personal computer (PC) 4, a server 6, a network link 7, a server 8, and a mobile terminal device 10. One PC 4, one server 6, and one server 8 are illustrated in FIG. 1, but the network system 2 includes a plurality of PCs 4, a plurality of servers 6, and a plurality of servers 8. Further, the plurality of servers 6 and the plurality of servers 8 are connected with each other through the network link 7, and the plurality of PCs 4 are connected with the server 6.

The PC 4 is a device that creates a web page such as a home page and is connected, in a communicable state, with the server 6 in a wired or wireless manner. The PC 4 is a so-called personal computer and has various functions as well as a function of creating the web page. The web page is configured with a combination of HTML data, XHTML data, a style sheet, image data, and the like.

The server 6 is connected with the plurality of PCs 4 and performs transmission and reception of data with the PCs 4. The server 6 is also connected with another server 6 or the server 8 through the link and also performs transmission and reception of data with another server 6 or the server 8. The server 6 stores the web page created by the PC 4 as data.

The network link 7 is connected with the plurality of servers 6 and the plurality of servers 8 in a wired or wireless manner and performs transmission and reception of data between the server 6 and the server 8.

The server 8 is connected, in a communicable state, with a plurality of mobile terminal devices 10 in a wireless manner and performs transmission and reception of data with the mobile terminal devices 10. Similarly to the server 6, the server 8 is also connected with the server 6 or another server 8 through the link and also performs transmission and reception of data with the server 6 or another server 8. The server 8 will be described later in detail.

The mobile terminal device 10 is connected, in a communicable state, with the server 8 in a wireless manner and performs transmission and reception of data with the server 8. The mobile terminal device 10 will be described later in detail.

In the network system 2, when the mobile terminal device 10 transmits a transmission request of a web page created by the PC 4 to the server 8, the server 8 performs communication with the server 6 in which data of the web page created by the PC 4 is stored and acquires data of the web page from the server 6. The server 6 performs a process, which will be described later, on the acquired data of the web page and transmits the data of the web page to the mobile terminal device 10. As described above, in the network system 2, the server 6 and the server 8 are connected with each other through the network link 7, and data of the web page stored in another server is acquired based on the transmission request (connection request) transmitted from the mobile terminal and then transmitted to the mobile terminal. When the mobile terminal connected to the server transmits the transmission request of data of the web page stored in the server, data of the web page stored in the server is transmitted to the mobile terminal that has transmitted the transmission request without interposing another server.

Figure 2:
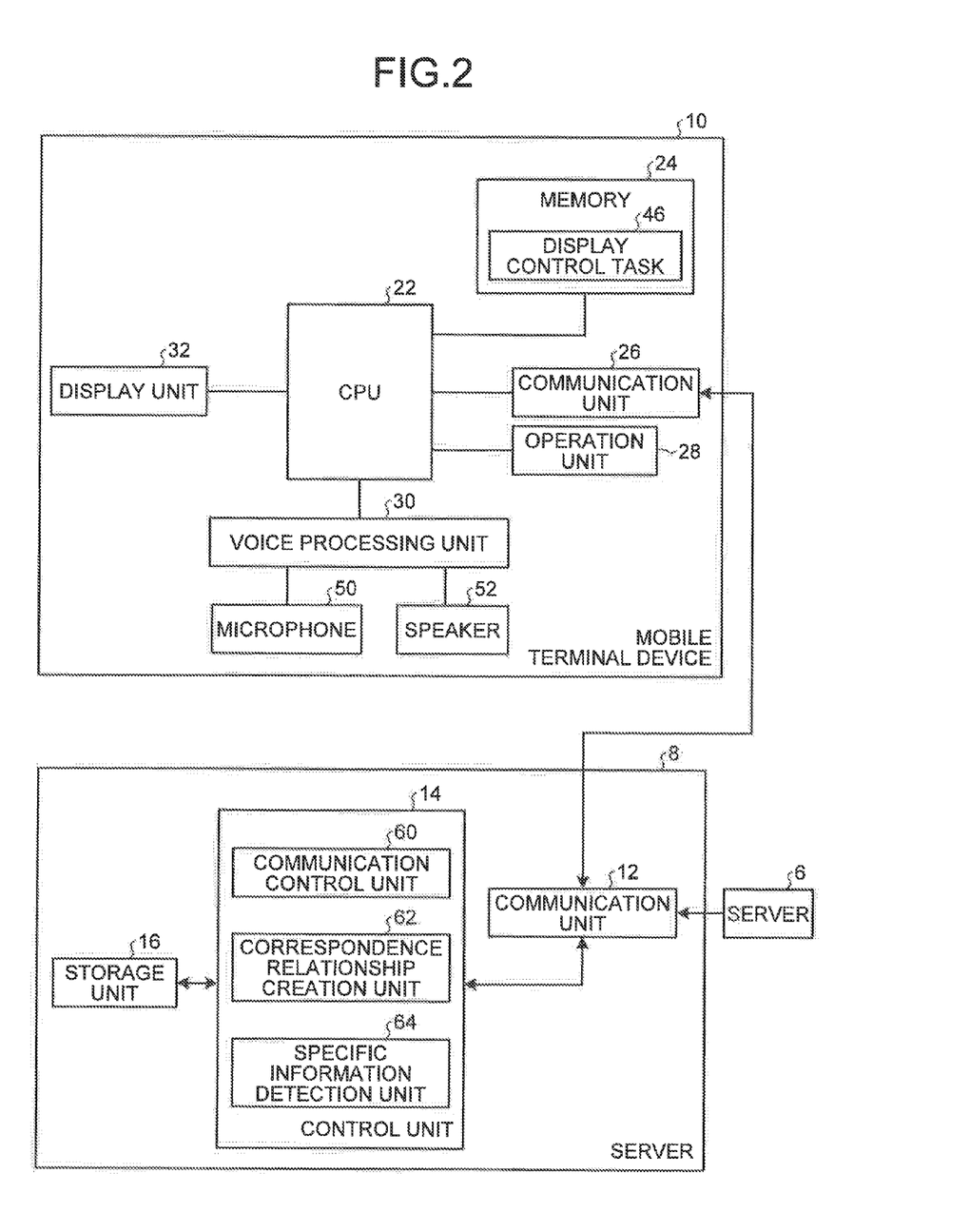
FIG. 2 is a block diagram illustrating a schematic configuration of a server and a mobile terminal illustrated in FIG. 1.
Figure 3:
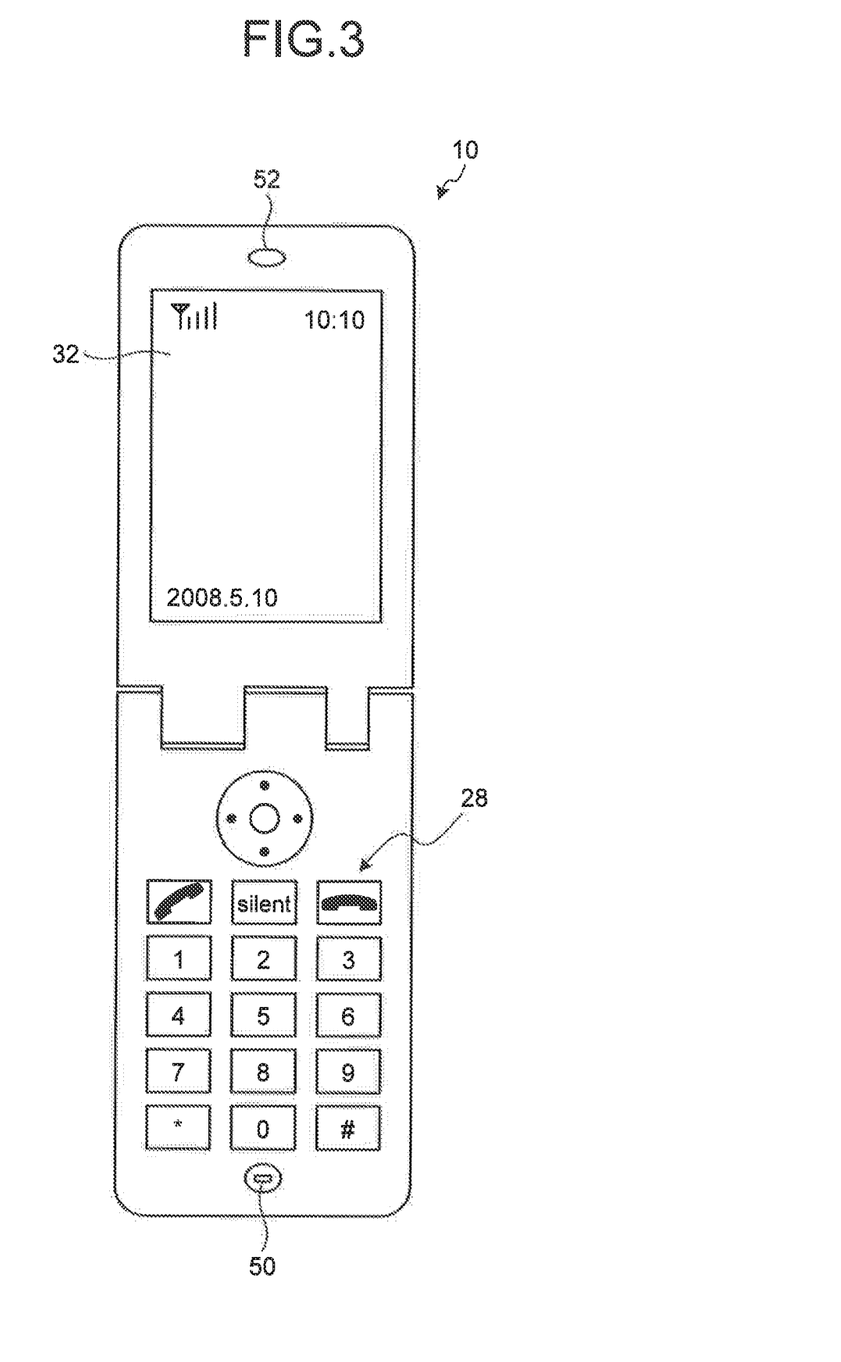
FIG. 3 is a front view illustrating a schematic configuration of an outer appearance of the mobile terminal device illustrated in FIG. 2.

Next, the server 8 and the mobile terminal device 10 in the network system 2 will be described in detail. FIG. 2 is a block diagram illustrating a schematic configuration of an embodiment of the server and the mobile terminal illustrated in FIG. 1. FIG. 3 is a front view illustrating a schematic configuration of an outer appearance of the mobile terminal device illustrated in FIG. 2. As illustrated in FIG. 2, the server 8 includes a communication unit 12 that functions as a reception unit and a transmission unit, a control unit 14, and a storage unit 16.

The communication unit 12 establishes a signal link with the mobile terminal device 10 through a base station and performs information communication. The communication unit 12 also performs information communication with the server 6 or another server 8 in a wired or wireless manner.

The control unit 14 controls operations of the communication unit 12 and the other components of the server 8 and processes information supplied from the components. The control unit 14 includes a communication control unit 60, a correspondence relationship creation unit 62, and a specific information detection unit 64.

The communication control unit 60 controls an operation of the communication unit 12. When the transmission request (connection request) of the web page is received from the mobile terminal device 10, the communication control unit 60 acquires the web page, for which the mobile terminal device 10 has made the transmission request, from the server 6 through the communication unit 12 based on the received transmission request. When the web page is acquired, the communication unit 60 transmits the acquired web page to the mobile terminal device 10 that has transmitted the transmission request through the communication unit 12 together with a correspondence relationship between specific information of another web page included in the web page and the number of transmission times, which will be described later.

The correspondence relationship creation unit 62 counts the number of times that information of the web page has been transmitted to the mobile terminal device 10, with which information communication is performed through the communication unit 12 (that is, with which information communication is performed without interposing another server 6 or another server 8), for each web page, creates a correspondence relationship between the web page and the number of transmission times of information of the web page, and stores the correspondence relationship in the storage unit 16. The correspondence relationship creation unit 62 updates the correspondence relationship between the web page and the number of transmission times stored in the storage unit 16 when the web page is transmitted from the communication unit 12. At this time, a correspondence relationship may be created by associating all data of the web page with the number of transmission times, but in order to reduce a data amount stored in the storage unit 16, a correspondence relationship may be created by associating specific information specifying the web page such as a uniform resource locator (URL) with the number of times that information of the web page specified by the specific information has been transmitted. Hereinafter, in the present embodiment, it is assumed that a correspondence relationship between specific information of a web page and the number of times that information of the web page has been transmitted, that is, the number of times that the web page has been browsed (that is, the number of accesses, hereinafter also referred to as "the number of browsing times") is created.

When the communication unit 12 receives the web page for which the transmission request has been made from another server 6 or another server 8, the specific information detection unit 64 analyzes data of the received web page and detects specific information of another web page included in the web page. The specific information detection unit 64 detects the number of browsing times of each of the detected specific information of another web page from the correspondence relationship between the specific information of the web page and the number of browsing times stored in the storage unit 16. Thereafter, the correspondence relationship creation unit 62 creates information (table) representing a relationship between the specific information of another web page included in the web page and the number of browsing times. The information representing the relationship between the specific information of another web page included in the web page and the number of browsing times, which has been created by the correspondence relationship creation unit 62, is transmitted to the mobile terminal device 10 that has transmitted the transmission request together with the information of the web page through the communication unit 12 as described above.

The storage unit 16 stores the correspondence relationship between the specific information of the web page and the number of times that the web page related to the specific information has been transmitted, which has been created by the control unit 14. Further, programs or conditions necessary for operating the components of the server 8 are stored in the storage unit 16 and read out by the control unit 14 as necessary.

Next, the mobile terminal device 10 will be described. As illustrated in FIGS. 2 and 3, the mobile terminal device 10 includes a central processing unit (CPU) 22, a memory 24, a communication unit 26 as a reception unit, an operation unit 28, a voice processing unit 30, and a display unit 32. The mobile terminal device 10 has various configurations, provided as mobile terminal device, such as various terminals in addition to the above configuration. The shape of the mobile terminal device is not particularly limited, and a mobile terminal device of a folder type that includes two cases connected by a hinge and is foldable, a mobile terminal device of a slide type in which two cases can slide against each other, or a mobile terminal device of a straight type may be used.

The CPU 22 is a processing unit (control unit) that generally controls an overall operation of the mobile terminal device 10. That is, the CPU 22 controls operations of the communication unit 26, the voice processing unit 30, the display unit 32, and the like so that various processes of the mobile terminal device 10 can be performed in an appropriate procedure in response to an operation on the operation unit 28 or software stored in the memory 24 of the mobile terminal device 10. For example, the various processes of the mobile terminal device 10 include voice communication performed through a line switching network, creation, transmission, and reception of an electronic mail, browsing of a web (world wide web) site of the Internet, and the like. For example, the operations of the communication unit 26, the voice processing unit 30, the display unit 32, and the like include transmission and reception of a signal by the communication unit 26, input and output of a voice by the voice processing unit 30, display of an image by the display unit 32, and the like.

The CPU 22 executes a process based on a program (for example, an operation system (OS) program, an application program, or the like) stored in the memory 24. For example, the CPU 22 is configured with a micro processor unit (MPU) and executes the above described various processes of the mobile terminal device 10 according to the procedure instructed by the program. That is, the CPU 22 sequentially reads a command code from the OS program or the application program stored in the memory 24 and executes the process.

The CPU 22 has a function of executing a plurality of application programs. As the application program executed by the CPU 22, there are a plurality of application programs such as a display control application program of controlling the display form of the acquired web page, a game application program, and the like. The application program includes a browser that displays the web page on the display unit 32. The display control application program is a program that controls the display form of the specific information specifying another web page included in the web page according to the number of browsing times of the web page.

The memory 24 stores software or data used for the process of the CPU 22 and a display control task 46 for operating the above described display control application program. The display control task 46 will be described later in detail. In addition to the task, the memory 24 stores, for example, communication, downloaded image data, voice data, and the like. Further, the memory 24 stores software that the CPU uses for controlling the memory 24, an address book in which the other communication party's telephone number or mail address or the like is stored and managed, a voice file such as a dial tone or a ring tone, temporal data used in a processing process of software, or the like. A computer program or temporal data used in the processing process of the software is temporarily stored in a work area assigned to the memory 24 by the CPU 24. For example, the memory 24 includes a non-volatile storage device (a non-volatile semiconductor memory such as a read only memory (ROM), a hard disk device, or the like), a readable/writable storage device (for example, a static random access memory (SRAM) or a dynamic random access memory (DRAM)), and the like.

The communication unit 26 establishes a wireless signal link with the base station by a code division multiple access (CDMA) scheme or the like through a channel assigned by the base station and performs telephone communication and information communication with the base station. That is, the communication unit 26 performs information communication with the communication unit 12 of the server 8 through the base station.

The operation unit 28 includes keys, to which various functions are assigned, such as a power key, a speech key, a digit key, a character key, a directional key, a decision key, a call origination key, and the like as illustrated in FIG. 3. When the user presses the key down, a signal is generated in response to the operation. The generated signal is input to the CPU 22 as the user's instruction.

The voice processing unit 30 executes a process of a voice signal input to a microphone 50 or a voice signal to be output from a speaker 52. That is, the voice processing unit 30 amplifies a voice input from the microphone 50, converts the voice into digital voice data by executing analog/digital (A/D) conversion and then further executing a signal process such as encoding, and outputs the digital voice data to the CPU 22. The voice processing unit 30 converts voice data sent from the CPU 22 into an analog voice signal by executing processes such as decoding, D/A conversion, and amplification, and then outputs the analog voice signal to the speaker 52. As illustrated in FIGS. 2 and 3, the microphone 50 and the speaker 52 are disposed at both ends of the mobile terminal device 10, respectively.

The display unit 32 includes a display panel such as a liquid crystal display (LCD) of a predetermined size or an organic electro-luminescence (OEL) panel as illustrated in FIG. 3 and displays an image according to image data supplied from the CPU 22 on the display panel.

Figure 4:
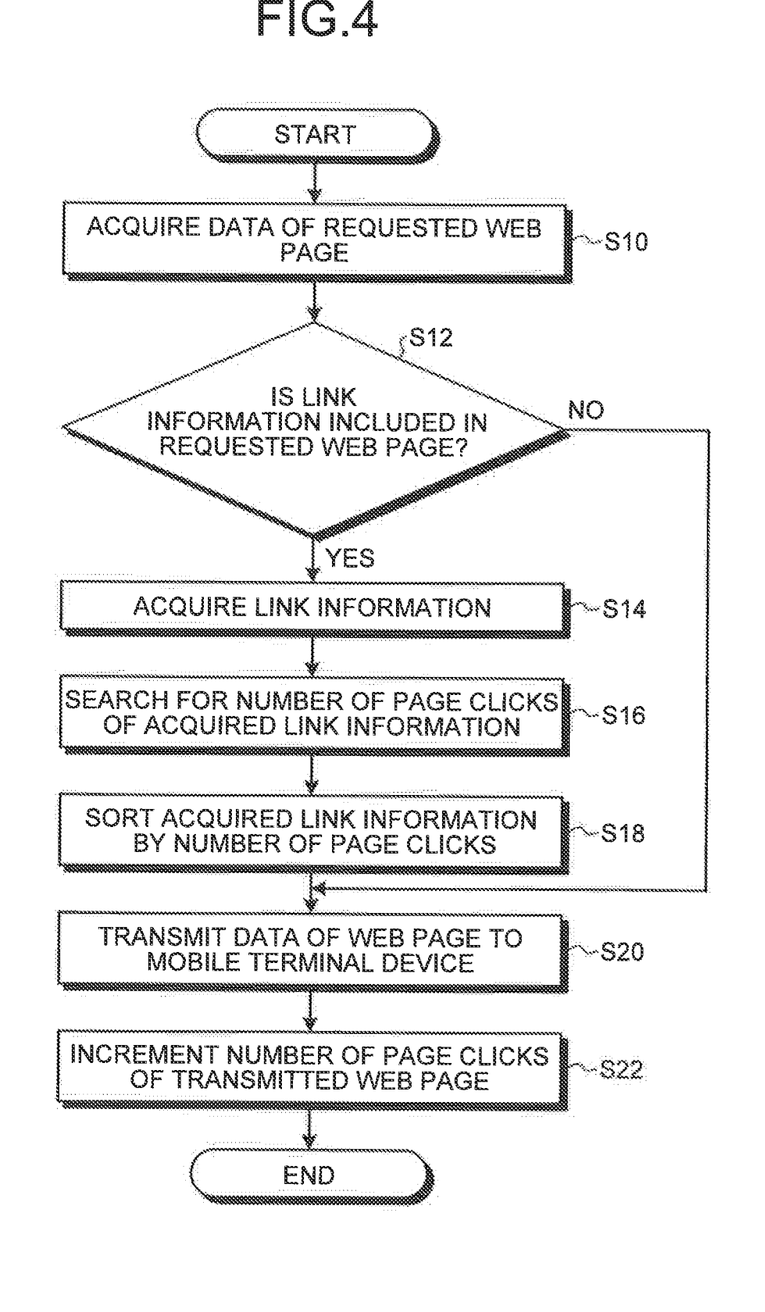
FIG. 4 is a flowchart illustrating an example of a processing operation of a server.
Figure 5:
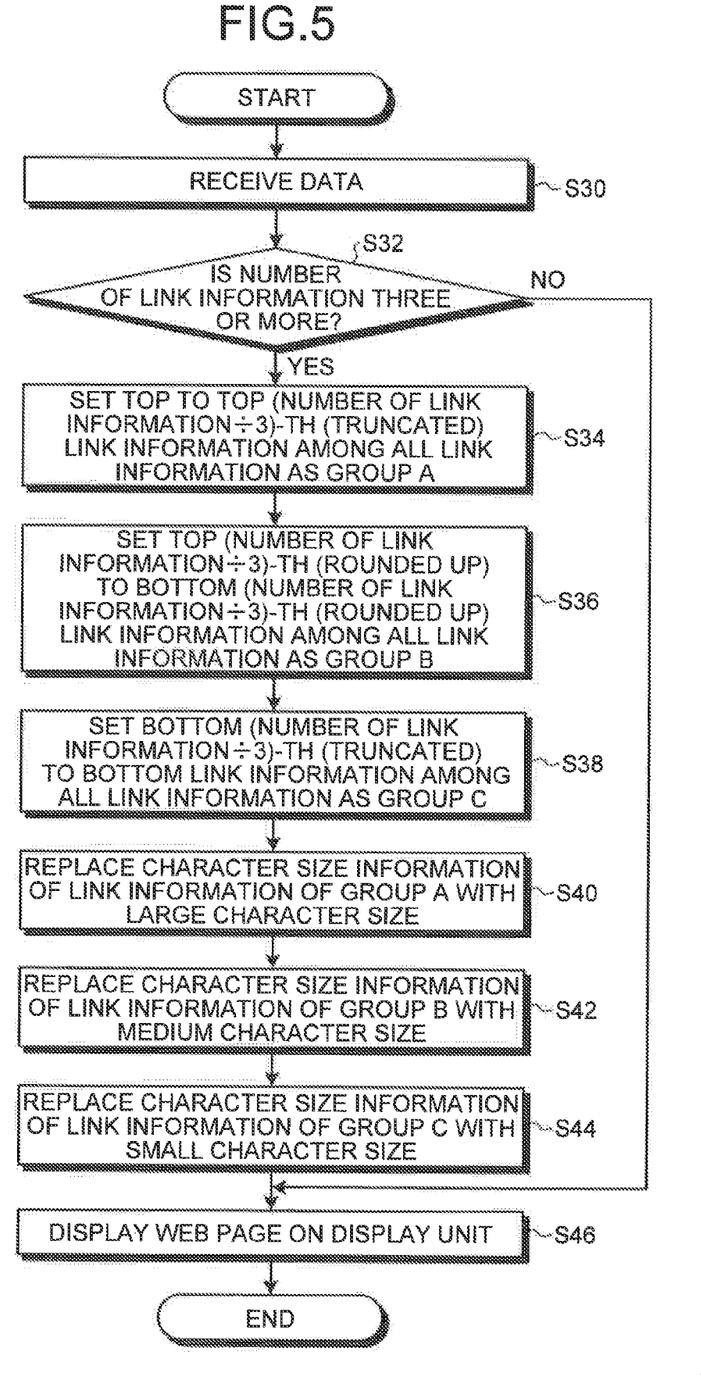
FIG. 5 is a flowchart illustrating an example of a processing operation of a mobile terminal device.
Figure 6A:
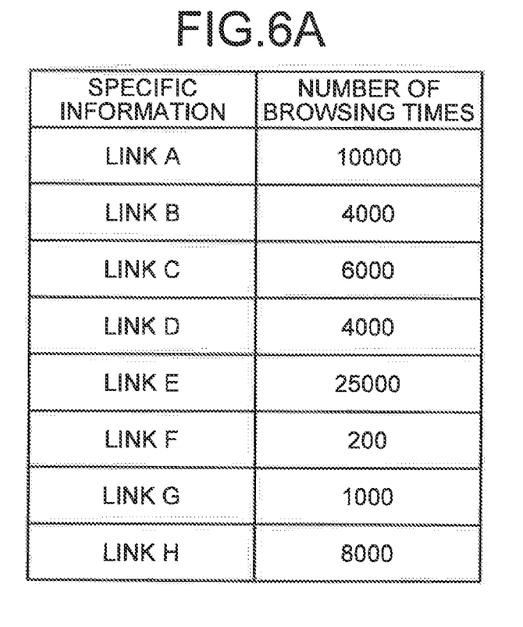
FIG. 6A is an explanation diagrams for explaining a processing operation of a server.
Figure 6B:
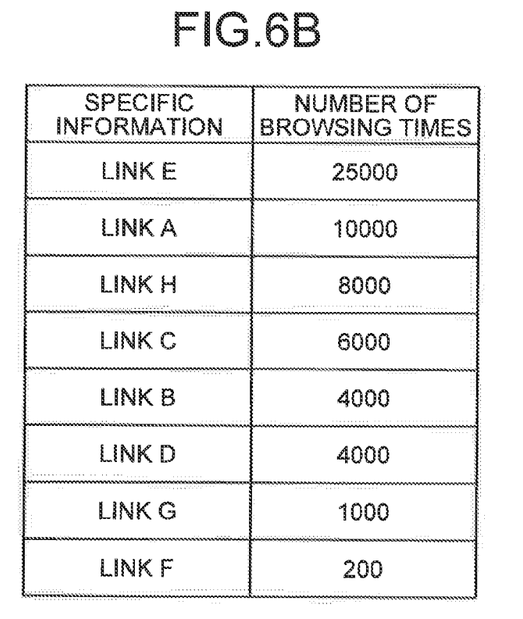
FIG. 6B is an explanation diagram for explaining a processing operation of a server.
Figure 7A:
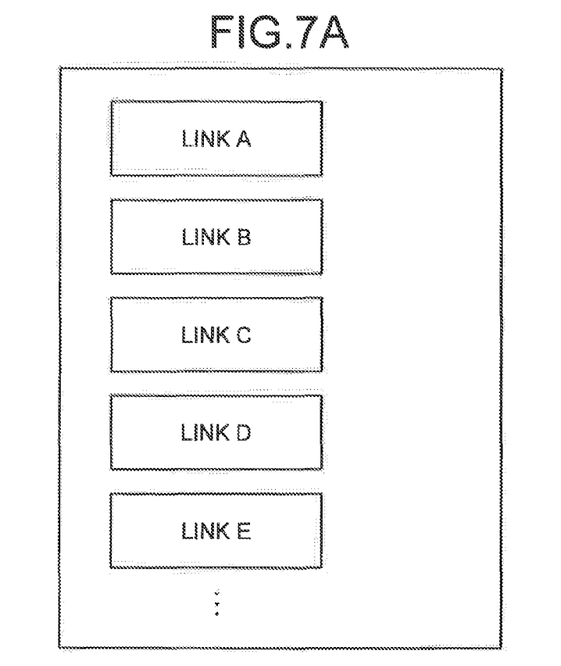
FIG. 7A is an image diagram schematically illustrating a web page displayed on a display unit.
Figure 7B:
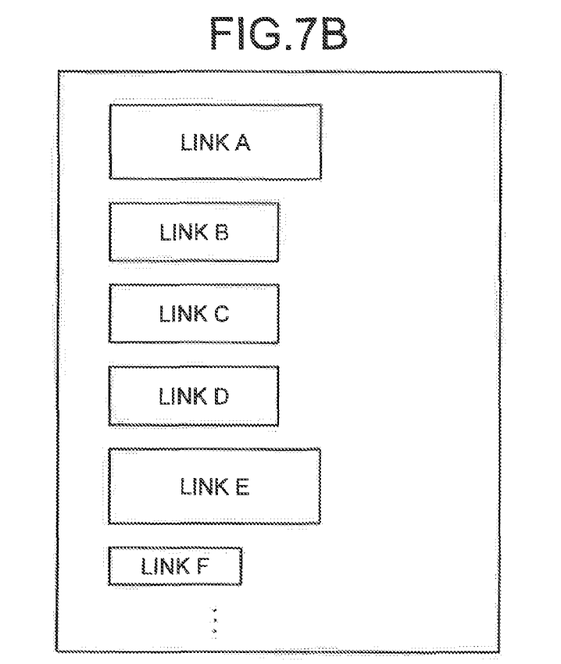
FIG. 7B is an image diagram schematically illustrating a web page displayed on a display unit.

Next, an operation of the network system 2 will be described. FIG. 4 is a flowchart illustrating an example of a processing operation of the server, and FIG. 5 is a flowchart illustrating an example of a processing operation of the mobile terminal device. FIGS. 6A and 6B are explanation diagrams for explaining a processing operation of the server, and FIGS. 7A and 7B are image diagrams schematically illustrating web pages displayed on the display unit, respectively.

First, a transmission request (hereinafter, may be referred to as a "request") of a web page is transmitted from the mobile terminal device 10 to the server 8. Here, the transmission request of the web page is, for example, information that includes specific information, an instruction of the transmission request, and terminal information that specifies the mobile terminal device that has transmitted the transmission request. Here, the specific information of the web page for which the transmission request has been made is, for example, specific information that is input directly by the user or specific information of another web page included in the web page whose reception has been decided by an operator's click or the like during browsing of the web page.

The server 8 that has received the transmission request of the web page performs the process in the procedure illustrated in FIG. 4. First, when the request is received from the mobile terminal device 10, in step S10, the server 8 acquires data of the requested web page. Specifically, the server 8 specifies the server 6 that is storing data of the web page based on the specific information of the web page included in the request, performs communication with the server 6, and acquires data of the request web page, that is, information of the web page such as HTLM data.

When the data of the requested web page is acquired, in step S12, the server 8 determines whether or not link information is included in the requested web page (the acquired web page) through the specific information detection unit 64. That is, it is determined whether or not the specific information of another web page is included in the web page. When it is determined that the link information is included (Yes in step S12), the process proceeds to step S14, whereas when it is determined that the link information is not included (No in step S12), the process proceeds to step S20.

In step S14, the server 8 acquires the link information included in the acquired web page. That is, the server 8 detects and acquires the specific information of another web page included in the web page through the specific information detection unit 64.

When the specific information of another web page is acquired, in step S16, the server 8 searches for the number of page clicks (that is, the number of browsing times or the number of accesses) of another web page specified by the acquired link information. That is, in step S16, the server 8 reads the correspondence relationship between the web page and the number of browsing times that has been created by the correspondence relationship creation unit 62 and stored in the storage unit 16, and searches for and detects the number of browsing times of the web page for each specific information based on the acquired specific information of another web page. For example, when 8 pieces of specific information from a link A to a link H are included in the web page, as illustrated in FIG. 6A, the number of browsing times of another web page specified by each of the specific information (link information) from the link A to the link H is detected.

Next, in step S18, the server 8 sorts the acquired link information by the number of page clicks. The correspondence relationship creation unit 62 creates information (table) representing a relationship between the sorted link information (that is, the specific information) and the number of page clicks (that is, the number of browsing times). For example, the correspondence relationship creation unit 62 creates information of a table in which the specific information is sorted in a descending order of the number of browsing times as illustrated in FIG. 6B based on the relationship between the specific information and the number of browsing times illustrated in FIG. 6A.

When the information of the correspondence relationship between the specific information included in the web page and the number of browsing times is created by the correspondence relationship creation unit 62, in step S20, the server 8 transmits the information of the correspondence relationship between the specific information included in the web page and the number of browsing times and information of the web page acquired from the server 6 to the mobile terminal device 10 that has transmitted the transmission request through the communication unit 12. Further, when the specific information detection unit 64 determines, in step S12, that the link information is not included in the web page, the server 8 transmits only data of the web page to the mobile terminal device 10.

When the information is transmitted to the mobile terminal device 10 in step S20, in step S22, the server 8 increases the number of page clicks of the web page whose information has been transmitted. Specifically, the server 8 transmits the information of the web page and information of a correspondence relationship between the specific information included in the web page and the number of browsing times to the mobile terminal device 10 through the communication unit 12 under control of the communication control unit 60. The fact that the information of the web page has been transmitted is notified to the correspondence relationship creation unit 62. The correspondence relationship creation unit 62 that has been notified of the fact that the information of the web page has been transmitted updates the correspondence relationship stored in the storage unit 16 by increasing the number of browsing times of the transmitted web page by one. When the number of page clicks of the web page is increased, the server 8 finishes the process.

The mobile terminal device 10 that has transmitted the transmission request of the web page to the server 8 performs the process in the procedure illustrated in FIG. 5. First, in step S30, the communication unit 26 receives data transmitted from the server 8, that is, the web page acquired from the server 6 and the information of the correspondence relationship between the specific information included in the web page and the number of browsing times.

When the data transmitted from the server 8 is received through the communication unit 26, the mobile terminal device 10 reads the display control task 46 from the memory 24 through the CPU 22, launches the display control application program, and processes the transmitted data. Specifically, in step S32, the CPU 22 of the mobile terminal device 10 determines whether three or more pieces of link information are included in the received web page based on the information of the correspondence relationship between the specific information included in the web page and the number of browsing times. When the CPU 22 determines that three or more pieces of link information are included (Yes), the process proceeds to step S34, whereas when the CPU 22 determines that three or more pieces of link information are not included (No), the process proceeds to step S46.

In step S34, the CPU 22 sets link information, whose number of browsing times ranks from the top to the top (the number of link information÷3)-th (a first digit after decimal point is truncated), among all link information as a group A. That is, in the present embodiment, the CPU 22 sets 2 pieces of link information, which are the top two in the number of browsing times, that is, a link E and a link A, among 8 pieces of link information as a group A.

Next, in step S36, the CPU 22 sets link information, whose number of browsing times ranks from the top (the number of link information÷3)-th (a first digit after decimal point is rounded up) to the bottom (the number of link information÷3)-th (a first digit after decimal point is rounded up), among all link information as a group B. That is, in the present embodiment, the CPU 22 sets 4 pieces of link information that are from the top third to the bottom third, i.e., the top sixth in the number of browsing times, that is, a link H, a link C, a link B, and a link D, among 8 pieces of link information as a group B.

Next, in step S38, the CPU 22 sets link information, whose number of browsing times ranks from the bottom (the number of link information÷3)-th (a first digit after decimal point is truncated) to the bottom, among all link information as a group C. That is, in the present embodiment, the CPU 22 sets 2 pieces of link information, which are the bottom two in the number of browsing times, that is, a link G and a link F, among 8 pieces of link information as a group C.

Next, in step S40, the CPU 22 replace character size information of the link information of the group A with the large character size. Next, in step S42, the CPU 22 replaces character size information of the link information of the group B with the medium character size. Next, in step S44, the CPU 22 replaces character size information of the link information of the group C with the small character size.

Next, in step S46, the CPU 22 displays the web page in which the information of the character size of the link information has been changed in step S40 to step S44 on the display unit 32 and finishes the process.

As described above, according to the server 8 and the mobile terminal device 10 of the present invention, by changing the size of the character of the link information included in the web page according to the number of browsing times of the web page specified by the link information, as illustrated in FIG. 7B, it is possible to vary the size of the link information displayed on the display unit 12 according to the group of the number of browsing times. In the present embodiment, by displaying and emphasizing the link information of the web page that is relatively large in the number of browsing times with the size larger than other link information, the user can easily determine the link information that is useful for the user among the link information included in the web page.

Further, according to the present invention, by displaying the link information of the web page that is relatively small in the number of browsing times with the small size, it is possible to increase an information amount that can be displayed on the display unit. Since the size of a part that is low in degree of importance for an operator decreases, more information necessary for the operator can be displayed on the display unit. Also, in the case of displaying a search result performed by an existing search engine on the display unit, the present invention can be applied. That is, in the case of displaying the web page including a lot of specific information as a search result on the display unit, the present invention is effective.

Further, in the present invention, the character has the large size, the medium size, and the small size, but the size of the character in the present invention is not particularly limited thereto. In the case in which an area necessary for displaying the specific information included in the web page on the display unit is broader than a display area of the display unit, it is preferable not to allow the character to be larger than the standard size but to gradually decrease the size of the character as the number of browsing times decreases. Thus, since the size of the character does not increase, it is possible to further increase an amount of information that can be displayed on the display unit.

In the above described embodiment, the CPU 22 controls the display form of each of the specific information when three or more pieces of specific information are included in one web page. However, the present invention is not limited thereto, and the control may be performed when two or more pieces of specific information are included or four or more pieces of specific information are included. Further, in the above described embodiment, in step S34 to step S38, the link information is classified into three groups. However, the number of classified groups is not limited thereto, and the link information may be classified into two groups or four or more groups. Further, the number of link information included in each group needs not be nearly uniform and may have an arbitrary ratio.

A grouping criterion is not limited to the relative number of browsing times, and the specific information may be grouped based on the absolute number of browsing times. For example, ten thousand times or more may be classified as a group A, a thousand times or more and less than ten thousand times may be classified as a group, and times less than a thousand may be classified as a group C.

Further, the display form of the specific information of the web page may be individually controlled one by one without grouping the specific information. For example, as the number of browsing times decreases, the display size of the specific information may gradually decrease. Further, in the above described embodiment, the link information that is relatively large in the number of browsing times is displayed with the relatively large size, but the link information that is relatively small in the number of browsing times may be displayed with the relatively large size. A relationship between the number of browsing times and the display form may be changed by the user's setting.

Further, in the present invention, a technique of controlling the display form of the specific information on the web page is not limited to changing the size of the character but may include changing the width of the character or changing the color of the character.

Further, in the present invention, information displayed as the specific information when displaying the web page on the display unit is not limited to character information but may include an image or a picture.

Here, as the number of browsing times of the web page, the number of browsing times within a set time period such as one month or one week may be used. By setting a specific time period as described above, the user can grasp the popularity of the web page easily. That is, in the case of the number of browsing times accumulated from the beginning of web page preparation or from the beginning of use of the server, a variation in the number of browsing times occurs depending on a time when the web page is prepared. On the other hand, by setting the time period, since a relative comparison can be made regardless of a preparation time of a web page, the user can grasp the popularity of each web page.

Further, in the case in which the number of browsing times within the set time period is used as the number of browsing times of the web page, a time when the server 8 has lastly received the transmission request of the web page may be used as a criterion, and a specific time period before the criterion time may be used. As a result, the user can figure the number of browsing times of the web page over a most recent time period of the time of transmission of the transmission request. Here, in the mobile terminal device 10, a time when a transmission request of a web page (a connection request of a predetermined web page) is made by the communication unit 26 becomes the criterion time. The set time period is not limited to a time period before the criterion time. For example, when the transmission request of the web page is made at 19:00 one day, the CPU 22 may control the display form of the link information based on the number of browsing times between 18:00 and 24:00 of the previous day.

Further, in the above-described embodiment, information related to the browsing state of the web page has been described as the number of browsing times (the number of accesses), that is, the number of times page view is performed. However, the present invention is not limited thereto, and information related to the browsing state, other than the number of accesses, such as the number of unique accesses or the number of valid users may be used.

Further, in the server 8 and the mobile terminal device 10, the process of controlling the display form of the specific information on the web page according to the number of browsing times of the web page, that is, the process of step S32 to step S44 (see FIG. 5) described above has been performed by the CPU 22 in the mobile terminal device 10, but a processing unit inside the server 8 may performs a process of processing a character string representing the display form of the specific information included in data of the web page and transmit the processed data of the web page to the mobile terminal device 10 through the communication unit 12. That is, the server 8 may perform step S32 to step S44 (see FIG. 5) during the processes of step S20 and step S22 (see FIG. 4). When the process of controlling the display form of the specific information is performed at the server 8 side as described above, a processing load of the mobile terminal device 10 can be reduced, and the limited processing capability of the mobile terminal device 10 can be effectively used. Further, in the case of performing the process at the server 8 side, the control condition of the display form can be transmitted from the mobile terminal device 10 to the server 8 in advance and stored in the storage unit 16. By storing the control condition of the display form in the server 8, it is possible to acquire and display data of the web page in which the display form of the specific information has been processed at the condition desired by the user.

Further, in the above described embodiment, the display form of the specific information is controlled by the CPU 22 based on the number of browsing times, but the present invention is not limited thereto. For example, the correspondence relationship creation unit 62 may use a keyword representing a scheme or a field of the contents of a web page as a tag to create information in which specific information is associated with the keyword. In this case, by storing a keyword interested by the user in the memory 24 and transmitting the keyword to the server 8 together with the transmission request of the web page, it is possible to emphasize and display specific information having the interested keyword among specific information included in the web page.

Further, the above described control of the display form of the specific information may be performed only in the case in which the web page is larger than the display unit, that is, in the case in which the screen needs be scrolled in order to browse the whole web page. That is, in the case in which the whole web page can be displayed on the display unit, the control of the display form may not be performed. As a result, in the case of scrolling the screen, a scroll amount can be reduced, and it is possible to prevent the size of the specific information from decreasing more than necessary.

Further, in the above described embodiment, the display form of the specific information included in the web page on the display unit is controlled by the CPU 22 based on the number of browsing times. However, the present invention is not limited thereto, and the display form of the specific information stored in the mobile terminal device such as a bookmark may be also controlled according to the number of browsing times.

Further, in the above described embodiment, the number of accesses to another web page has been described as information representing the communication status on another web page. However, the present invention is not limited thereto. For example, there is a case in which the server 6 or the server 8 that stores information of another web page is temporarily down and so communication with the server 6 or the server 8 is impossible. In this case, the specific information detection unit 64 cannot detect the accurate number of browsing times of another web page. Thus, the correspondence relation creation unit 63 associates information representing that the accurate number of browsing times of another web page cannot be detected with the link information of another web page. That is, whether or not another web page is in a connectable situation is dealt as the communication status on another web page. The communication control unit 16 transmits such information to the mobile terminal device 10 together with information of the web page through the communication unit 12.

When the link information of another web page and the information representing that the accurate number of browsing times of another web page cannot be detected are received, the mobile terminal device 10 performs, for example, control of graying the background of a part, on which the link information of another web page is being displayed in the web page, through the CPU 22. As a result, the user of the mobile terminal device 10 can notice that the server that stores another web page has been down. Further, as information as to whether or another web page is in a connectable situation, a degree of concentration of access to the server may be used.

Further, in the above described embodiment, the number of accesses to another web page has been described as an access situation to another web page, but the present invention is not limited thereto. For example, a time when the mobile terminal device 10 makes the transmission request of information of the web page, that is, an access time, may be used as the access situation to another web page.

Further, in the above described embodiment, the mobile terminal device has been described as the communication device, but the present invention is not limited thereto. For example, a personal computer or various communication devices having a communication function and an image display function, which are not of a portable type but of a standing type, may be used.

INDUSTRIAL APPLICABILITY

As described above, the communication device, the web server apparatus, and the communication system according to the present invention may be used in a communication device that displays a web page on a display unit, a web server apparatus that transmits the web page to such a communication device, or the like. Particularly, they are suitable for use in a mobile telephone that displays a web page including a plurality of specific information specifying another web page on a display unit, a server that transmits the web page to such a mobile telephone, or the like.

The invention claimed is:

1. A communication device, comprising:
    a communication unit configured to
        send a request including first specific information for specifying a first web page to a server, and
        receive first information and data of the first web page from the server, the first web page including a number of pieces of link information for specifying corresponding second web pages;
    a display unit; and
    a control unit comprising a hardware processor configured to
        open the first web page based on the first information,
        in response to the number of the pieces of link information being greater than a predetermined number, process the data of the first web page by
            sorting the pieces of link information in a predetermined order,
            setting each of the sorted pieces of link information to one group of a plurality of groups, wherein at least one of the groups includes more than one of the sorted pieces of link information, and
            setting different forms to different groups among the plurality of groups, wherein the same form is set to the pieces of link information in the same group, and
        cause the display unit to display the opened first web page in such a manner that each of the pieces of link information is displayed in the form set by the control unit,
    wherein, when the number of the pieces of link information is not greater than the predetermined number, the control unit is configured to, without processing the data of the first web page, cause the display unit to display the opened first web page, and
    wherein the predetermined number is greater than 2.

2. The communication device according to claim 1, wherein the forms are different from each other in at least one of a display size or a display color.

3. The communication device according to claim 1, wherein the number of the pieces of link information is greater than the number of the groups.

4. A communication system, comprising a server and a communication device,
the server configured to
receive a request including first specific information for specifying a first web page,
acquire first information of the first web page based on the first specific information, the first web page including a number of pieces of link information for specifying corresponding second web pages,
in response to the number of the pieces of link information being greater than a predetermined number, process data of the first web page by
sorting the pieces of link information in a predetermined order,
setting each of the sorted pieces of link information to one group of a plurality of groups, wherein at least one of the groups includes more than one of the sorted pieces of link information, and
setting different forms to different groups among the plurality of groups, wherein the same form is set to the pieces of link information in the same group, and
send the processed data of the first web page to a communication device;
the communication device configured to
send the request together with the keyword to the server,
receive the data of the first web page and the first information from the server,
open the first web page based on the first information, and
display the opened first web page in such a manner that each of the pieces of link information is displayed in the form set by the server,
wherein, when the number of the pieces of link information is not greater than the predetermined number, the server is configured to, without processing the data of the first web page, send the first information to the communication device, and
wherein the predetermined number is greater than 2.

5. A web server apparatus, comprising:
a communication unit configured to receive a request from a communication device, the request including first specific information for specifying a first web page; and
a control unit comprising a hardware processor configured to
acquire first information of the first web page based on the first specific information, the first web page including a number of pieces of link information for specifying corresponding second web pages, and
in response to the number of the pieces of link information being greater than a predetermined number, process data of the first web page by
sorting the pieces of link information in a predetermined order,
setting each of the sorted pieces of link information to one group of a plurality of groups, wherein at least one of the groups includes more than one of the sorted pieces of link information, and
setting different forms to different groups among the plurality of groups, wherein the same form is set to the pieces of link information in the same group, and
cause the communication unit to send the processed data of the first web page to the communication device so that the communication device opens the first web page and displays the opened first web page in such a manner that each of the pieces of link information is displayed in the form set by the control unit of the web server apparatus,
wherein, when the number of the pieces of link information is not greater than the predetermined number, the control unit is configured to, without processing the data of the first web page, cause the communication unit to send the first information to the communication device, and
wherein the predetermined number is greater than 2.

6. The web server apparatus according to claim 5, wherein the communication unit is configured to receive a user-defined control condition of the different forms from the communication device, and
the control unit is configured to set the different forms to the different groups among the plurality of groups in accordance with the user-defined control condition received from the communication device.

* * * * *